United States Patent
Pinkstone et al.

(10) Patent No.: US 12,036,844 B2
(45) Date of Patent: Jul. 16, 2024

(54) VEHICLE VENT ASSEMBLY

(71) Applicant: Dyson Technology Limited, Wiltshire (GB)

(72) Inventors: Adam Pinkstone, Gloucester (GB); Roy Alan Harris, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 383 days.

(21) Appl. No.: 17/600,986

(22) PCT Filed: Feb. 3, 2020

(86) PCT No.: PCT/GB2020/050240
§ 371 (c)(1),
(2) Date: Oct. 1, 2021

(87) PCT Pub. No.: WO2020/201674
PCT Pub. Date: Oct. 8, 2020

(65) Prior Publication Data
US 2022/0176784 A1 Jun. 9, 2022

(30) Foreign Application Priority Data
Apr. 5, 2019 (GB) ........................ 1904839

(51) Int. Cl.
*B60H 1/34* (2006.01)
*B60H 1/24* (2006.01)

(52) U.S. Cl.
CPC .......... *B60H 1/3414* (2013.01); *B60H 1/243* (2013.01)

(58) Field of Classification Search
CPC ...... B60H 1/3414; B60H 1/243; B60H 1/246; F24F 13/062; F24F 13/18
See application file for complete search history.

(56) References Cited

U.S. PATENT DOCUMENTS

| 3,752,401 A | 8/1973 | Kizilos |
| 3,888,506 A | 6/1975 | Haas |

(Continued)

FOREIGN PATENT DOCUMENTS

| CA | 2704391 A1 * | 6/2009 | ............ B63H 11/04 |
| CN | 102563830 A | 7/2012 | |

(Continued)

OTHER PUBLICATIONS

GB Search Report received for GB Application No. 1904839, mailed on Sep. 18, 2019, 1 page.

(Continued)

*Primary Examiner* — Jessica Yuen
(74) *Attorney, Agent, or Firm* — Tucker Ellis LLP; Michael G. Craig

(57) ABSTRACT

A vehicle including a passenger cabin and a vent assembly is a disclosed. The vent assembly includes a duct for carrying an airflow and having an outlet through which the airflow is discharged into the passenger cabin; a deflector located within the duct, the deflector having a convex surface across which the airflow passes; and a valve extending around at least part of the convex surface for restricting the direction of the airflow across the convex surface. The airflow is discharged through the outlet in a direction defined by the direction of the airflow across the convex surface; and the valve is rotatable to vary the direction of the airflow across the convex surface.

16 Claims, 8 Drawing Sheets

(56) References Cited

U.S. PATENT DOCUMENTS

| | | | |
|---|---|---|---|
| 4,562,957 | A | 1/1986 | Nakagawa et al. |
| 4,585,177 | A | 4/1986 | Sugawara et al. |
| 4,679,730 | A | 7/1987 | Uchida |
| 4,783,115 | A | 11/1988 | Galubensky et al. |
| 7,614,682 | B1 | 11/2009 | Major et al. |
| 8,141,622 | B2 | 3/2012 | Kang et al. |
| 10,844,966 | B2 * | 11/2020 | Clement ............... F16K 5/0605 |
| 2006/0121843 | A1 | 6/2006 | Koval |
| 2008/0014855 | A1 | 1/2008 | Leserre |
| 2009/0038774 | A1 | 2/2009 | Ogiso et al. |
| 2013/0180354 | A1 | 7/2013 | Maranville et al. |
| 2014/0370797 | A1 | 12/2014 | Beau et al. |
| 2015/0126104 | A1 | 5/2015 | Hiroyuki |
| 2015/0197135 | A1 | 7/2015 | Chen et al. |
| 2015/0233328 | A1 | 8/2015 | Ghorpade et al. |
| 2016/0101668 | A1 | 4/2016 | Doll et al. |
| 2016/0121697 | A1 | 5/2016 | Yamamoto et al. |
| 2016/0167481 | A1 | 6/2016 | Makihara et al. |
| 2016/0368519 | A1 | 12/2016 | Stefan |
| 2017/0028818 | A1 | 2/2017 | Tille et al. |
| 2017/0144689 | A1 | 5/2017 | Peng et al. |
| 2017/0174246 | A1 | 6/2017 | Kossakovsk et al. |
| 2017/0326938 | A1 | 11/2017 | Motomura |
| 2018/0043752 | A1 | 2/2018 | Motomura et al. |
| 2018/0065601 | A1 | 3/2018 | Hagan et al. |
| 2018/0079278 | A1 | 3/2018 | Kirpichnikov et al. |
| 2018/0126819 | A1 | 5/2018 | Bast |
| 2018/0236844 | A1 | 8/2018 | Zemsch et al. |
| 2019/0009650 | A1 | 1/2019 | Yueksel |
| 2019/0092142 | A1 | 3/2019 | Dhake et al. |
| 2019/0126716 | A1 | 5/2019 | Jerker |
| 2022/0169094 | A1 | 6/2022 | Harris et al. |
| 2022/0194166 | A1 | 6/2022 | Harris et al. |

FOREIGN PATENT DOCUMENTS

| | | |
|---|---|---|
| CN | 203111289 U | 8/2013 |
| CN | 204236183 U | 4/2015 |
| CN | 104847545 A | 8/2015 |
| CN | 105109302 A | 12/2015 |
| CN | 105408155 A | 3/2016 |
| CN | 106163843 A | 11/2016 |
| CN | 106256574 A | 12/2016 |
| CN | 106969482 A | 7/2017 |
| CN | 107000545 A | 8/2017 |
| CN | 107792018 A | 3/2018 |
| CN | 107848362 A | 3/2018 |
| CN | 109195823 A | 1/2019 |
| CN | 109203919 A | 1/2019 |
| CN | 109552005 A | 4/2019 |
| DE | 2430553 | 1/1976 |
| DE | 2458643 A1 | 6/1976 |
| DE | 4317358 | 12/1994 |
| DE | 19854537 | 6/2000 |
| DE | 102004039950 | 3/2005 |
| DE | 102015100312 | 7/2015 |
| DE | 102015109069 | 12/2016 |
| DE | 102017113906 | 8/2017 |
| EP | 0189074 | 9/1988 |
| FR | 1076890 | 11/1954 |
| FR | 2886382 A1 | 12/2006 |
| FR | 2894521 | 6/2007 |
| FR | 2924058 A1 | 5/2009 |
| GB | 2072325 | 9/1981 |
| JP | 50-021849 | 3/1975 |
| JP | 55-170170 | 12/1980 |
| JP | 56-116510 | 9/1981 |
| JP | 56-155910 | 11/1981 |
| JP | 58-020839 | 2/1983 |
| JP | 58-067511 | 4/1983 |
| JP | 58-088206 | 5/1983 |
| JP | 59-057011 | 4/1984 |
| JP | 61-195236 A | 8/1986 |
| JP | 62-225844 | 10/1987 |
| JP | 62-225845 | 10/1987 |
| JP | 03-028071 | 2/1991 |
| JP | 04-123708 | 11/1992 |
| JP | 2004-148965 | 5/2004 |
| JP | 2005-145139 | 6/2005 |
| JP | 2005-153718 | 6/2005 |
| JP | 2006-240512 | 9/2006 |
| JP | 2013-241048 | 12/2013 |
| JP | 2015-020566 | 2/2015 |
| JP | 2015-214215 A | 12/2015 |
| JP | 2017-039381 | 2/2017 |
| KR | 10-2007-0068568 | 7/2007 |
| KR | 10-2017-0037343 A | 4/2017 |
| WO | 2006/125915 A1 | 11/2006 |
| WO | 2009/016717 | 2/2009 |
| WO | 2009/020173 | 11/2010 |
| WO | 2015/149248 A1 | 10/2015 |
| WO | 2019/048264 A1 | 3/2019 |

OTHER PUBLICATIONS

GB Search Report received for GB Application No. 1918885, mailed on May 11, 2020, 2 pages.

International Search Report and Written Opinion received for PCT Patent Application No. PCT/GB2020/050058, mailed on May 7, 2020, 10 pages.

International Search Report and Written Opinion received for PCT Patent Application No. PCT/GB2020/050239, mailed on Apr. 29, 2020, 10 pages.

International Search Report and Written Opinion received for PCT Patent Application No. PCT/GB2020/050240, mailed on May 6, 2020, 10 pages.

Search Report received for GB Application No. 1904837, mailed on Sep. 17, 2019, 1 page.

Search Report received for GB Application No. 1904838, mailed on Sep. 17, 2019, 1 page.

Office Action received for Chinese Patent Application No. 202080023465.2, mailed on Jul. 24, 2023, 7 pages (Original Document Only).

Office Action received for Chinese Patent Application No. 202080023491.5, mailed on Jul. 20, 2023, 18 pages (10 pages of English Translation and 8 pages of Original Document).

Office Action received for Chinese Patent Application No. 202080025036.9, mailed on Jul. 20, 2023, 19 pages (11 pages of English Translation and 8 pages of Original Document).

* cited by examiner

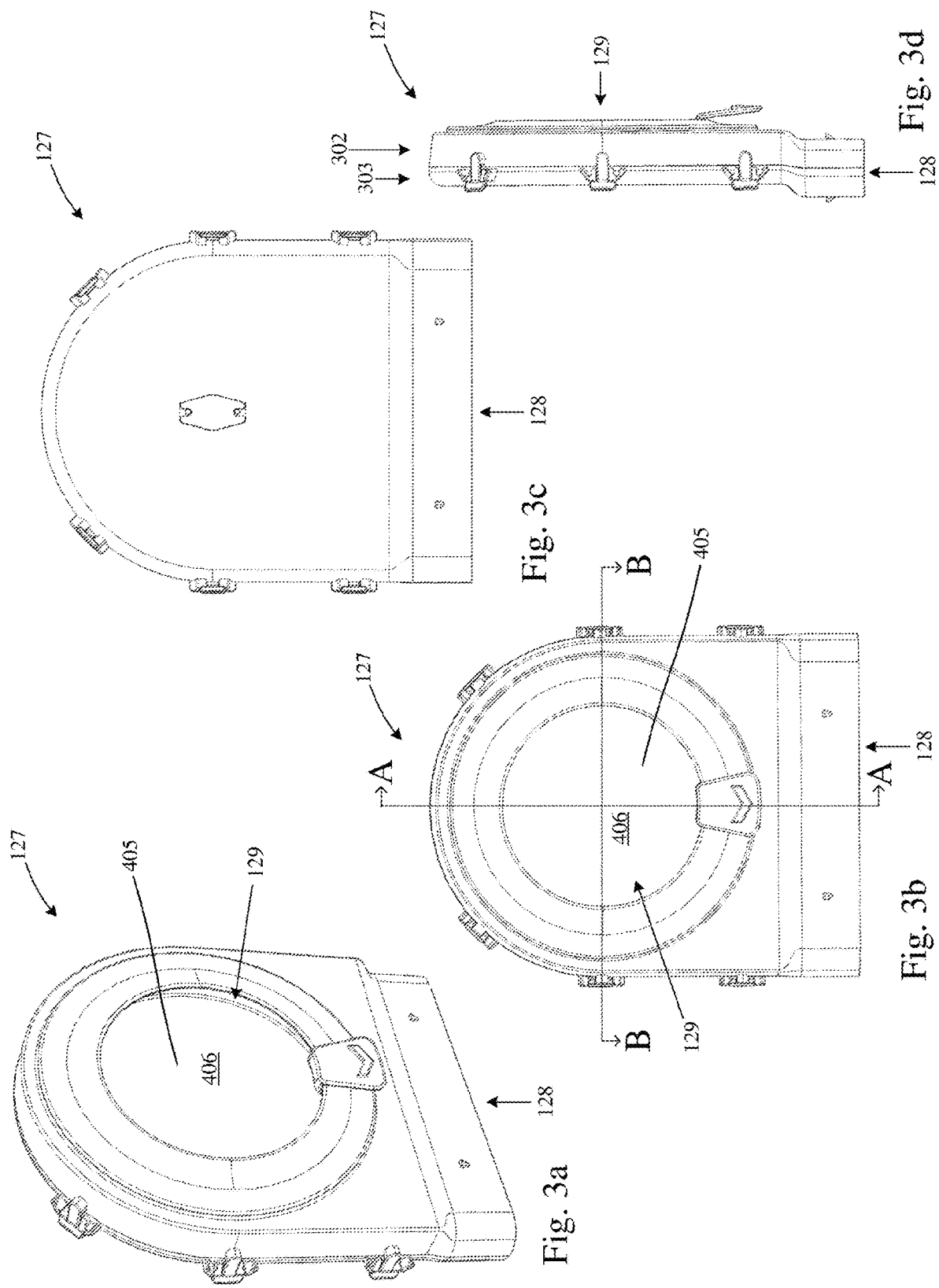

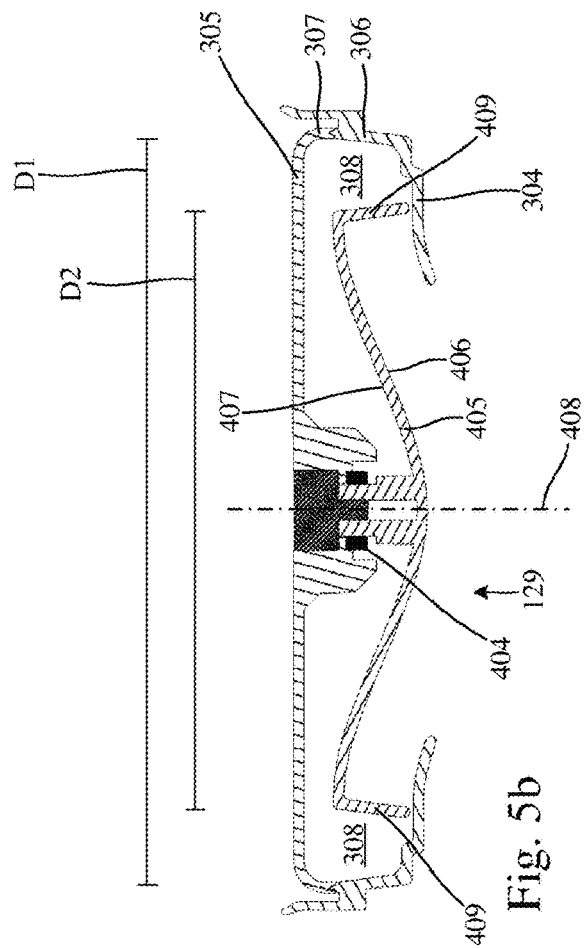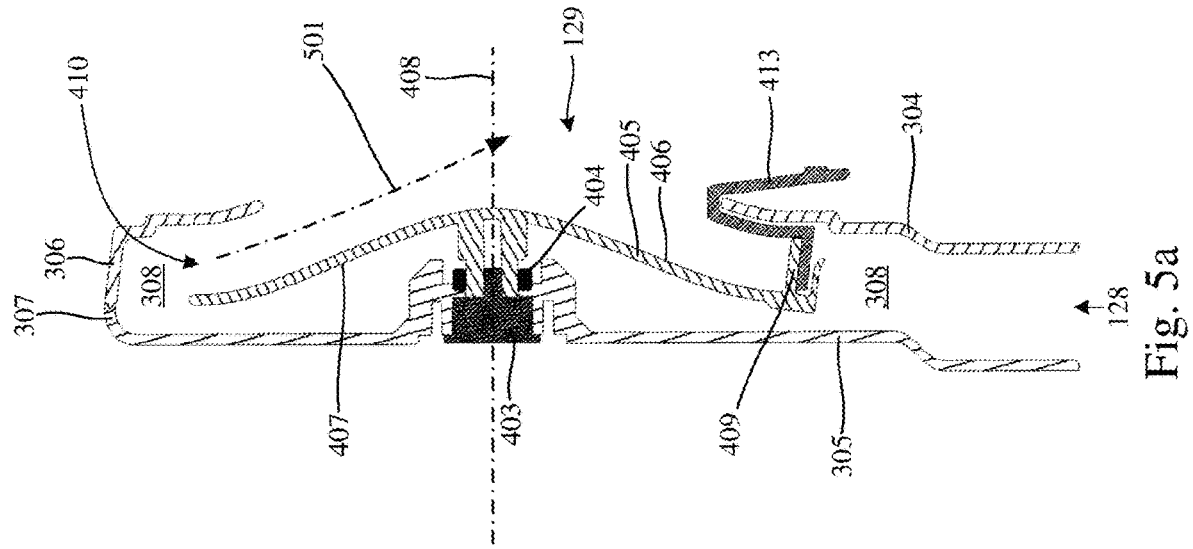

VEHICLE VENT ASSEMBLY

RELATED APPLICATION DATA

This application is the National Stage of International Application No. PCT/GB2020/050240 filed Feb. 3, 2020, and claims benefit of United Kingdom Application No. 1904839.6 filed Apr. 5, 2019, each of which are herein incorporated by reference in their entirety.

FIELD OF THE INVENTION

The present invention relates to a vehicle comprising a vent assembly for discharging air into a passenger cabin of the vehicle.

BACKGROUND OF THE INVENTION

Vehicles, such as passenger cars, usually include a ventilation system for discharging air into the passenger cabin of a vehicle to improve occupant comfort. Typically such ventilation systems include a fan unit for generating an airflow and one or more vents for discharging the airflow into the passenger cabin. The vents may be adjustable to vary the direction of the airflows discharged into the passenger cabin, for example, to allow a passenger to direct the airflow towards a particular region of the body.

SUMMARY OF THE INVENTION

According to a first aspect of the present invention there is provided a vehicle comprising a passenger cabin and a vent assembly, the vent assembly comprising: a duct for carrying an airflow and having an outlet through which the airflow is discharged into the passenger cabin; a deflector located within the duct, the deflector having a convex surface across which the airflow passes; and a valve extending around at least part of the convex surface for restricting the direction of the airflow across the convex surface, wherein the airflow is discharged through the outlet in a direction defined by the direction of the airflow across the convex surface; and the valve is rotatable to vary the direction of the airflow across the convex surface.

Airflow flowing through the duct thus encounters the deflector and flows diametrically across the convex surface. As the air flows across the convex surface it is deflected outwardly through the outlet into the passenger cabin as a jet of air.

The use of a convex surface located within the duct for turning the airflow has been observed to present a lesser restriction to the airflow than alternative means for turning the airflow, for example, to using slats or louvres across the outlet. As a result, a jet of air with a given flow rate may be obtained using a lesser power blower, thereby conserving electrical energy. Conversely, for a given blower power, a higher flow rate jet of air may be obtained, which may thereby provide improved ventilation to the passenger cabin.

The valve is rotatable to vary the direction of the airflow across the convex surface. The direction of the jet of air into the passenger cabin is a function of the direction of the airflow across the convex surface. Thus, the direction of the jet of air into the passenger cabin may be varied by rotation of the valve to allow targeting of the jet of air towards different regions of the passenger cabin.

The valve may prevent the airflow from being admitted around at least half of the convex surface. Preferably, the valve may prevent the airflow from being admitted around at least three-quarters of the convex surface.

By preventing airflow onto the convex surface around at least half, and preferably at least three-quarters, of the convex surface the direction of airflow across the convex surface may be restricted to airflow admitted around no more than half, or preferably one-quarter, of the convex surface. Consequently, the airflow is admitted across the convex surface with velocity vectors that are opposed by no more than 180°. As a result, the resultant jet of air formed by the airflow detaching from the convex surface may be relatively concentrated, i.e., the angle of divergence of the jet of air from the outlet may be relatively low. This arrangement may therefore advantageously allow relatively highly targeted ventilation of regions of the passenger cabin.

For example, the valve may comprise a wall for blocking airflow extending around at least half, or more preferably three-quarters, of the convex surface, i.e. a wall subtending a central angle of at least 180°, or more preferably at least 270°.

The valve may comprise an opening for admitting the airflow across the convex surface, and the valve may be rotatable such that the opening moves along a path extending around the convex surface. Airflow may thus be admitted across the convex surface through the opening. Because the opening moves around the convex surface, the direction of airflow across the convex surface may be varied. As a result, the direction of the resultant jet of air into the passenger cabin may be expected to be varied.

The valve may be rotatable such that the opening moves along the path through a central angle of at least 90°. That is to say, the freedom of the valve to rotate may be such that the valve is rotatable through an angle sufficient to move the opening along the path about the convex surface through a central angle of at least 90°. Thus, the average direction of the airflow admitted through the outlet across the convex surface may be varied by at least 90°. As a consequence, the average direction of the resultant jet of air may be adjusted through the same relatively great angle of at least 90°. Preferably, the freedom of the valve to rotate may be even greater, for example, such that the opening can be moved along the path through a central angle of at least 180°, or even more preferably at least 270°.

The valve may be rotatable about an axis of rotation that intersects an apex of the convex surface. Consequently, as the valve rotates the distance between the valve and the apex of the convex surface is unchanged. The shape of the resultant jet of air may typically be a function of the distance between the valve and the apex of the convex surface, for example, because the airflow may be expected to diffuse and/or change velocity as it flows between the valve and the apex of the convex surface. By maintaining the distance between the valve and the apex of the convex surface constant the shape of the resultant jet of air may correspondingly typically remain constant even when the direction of the jet is changed.

The deflector may be located within the duct in a position such that the outlet overlies the convex surface of the deflector. In other words, the deflector may be located directly behind the duct such that the convex surface of the deflector faces outwardly through the outlet. Consequently the distance between the convex surface and the outlet is minimised, and so the degree of diffusion of the jet of air as it passes through the outlet may be expected to be minimal. As a result, the jet of air is more likely to pass cleanly through the outlet with less interaction with the rim of the outlet.

A portion of the duct located upstream of the deflector may extend normally to a central axis of the convex surface. Consequently, airflow is ducted through that portion of the duct in a radial direction relative to the convex surface. As a result, the vent assembly may be more axially compact.

The valve may be rotatable independently of the deflector. In other words, the valve and the deflector may be separate independently mounted components. In this arrangement, the deflector may be statically mounted whilst permitting rotation of the valve. Static mounting of the deflector may be more easily achieved, and as a result the construction of the vent assembly may be simplified. Furthermore, where the valve is separate to the deflector, the mass of the valve and so it's may be expected to be reduced, and so the force required to be exerted on the valve to cause it to rotate may be reduced, facilitating easier operation of the valve.

The valve may be joined to and rotatable with the deflector. In other words, the valve may be structurally integrated with the deflector. This one-piece construction may simplify the process of manufacturing and assembling of the vent assembly. Furthermore, where the valve member is integral with the deflector, leakage of air between the valve and the deflector may be reduced. Consequently the direction of airflow across the convex surface may be better restricted.

The convex surface may be axisymmetric about an axis of rotation of the valve. Consequently, the degree of deflection of the airflow in the axial direction of the convex surface, and so the axial inclination of the resultant jet, will remain constant even as the valve is rotated around the convex surface to change the airflow direction across the convex surface.

The convex surface may define a ramp in the circumferential direction of the convex surface. The ramp in the convex surface may act to discourage airflow in the circumferential direction about the convex surface. Specifically, airflow in the circumferential direction that encounters the ramp may be accelerated in the radial direction and directed outwardly through the outlet. Reducing circumferential airflow about the convex surface may advantageously reduce the turbulence of the airflow across the convex surface, thereby reducing the restriction to airflow across the convex surface, and resulting in a more directionally focused airflow across the convex surface.

The vehicle may further comprise a handle connected to the valve and extending outside of the duct for manipulation by an occupant of the passenger cabin to cause the valve to rotate. The handle may thus be used by an occupant of the passenger cabin to rotate the valve to thereby vary the direction of the resultant jet of air into the passenger cabin.

The vehicle may further comprise an electric motor connected to the valve and operable to cause the valve to rotate. The motor may thus be used in conjunction with suitable electronic control means to rotate the valve to thereby vary the direction of the resultant jet of air into the passenger cabin. The electric motor may advantageously reduce the manual effort required to be exerted by a user to rotate the valve. Moreover, the electric motor and suitable electronic control means may facilitate automated control of the direction of the jet of air into the passenger cabin. Suitable electronic control means for controlling the stepper motor are well known in the art.

The electric motor may be at least partially located within a cavity of the deflector. In other words, the motor may be nested within a volume at least partly bounded by the deflector. For example, a surface of the deflector may be concave, and the motor may be nested in the concave profile. Consequently, the deflector and electric motor pair may be more axially compact.

The vehicle may comprise a seat located in the passenger cabin for seating a passenger, the vent assembly may be located at a position forward of the seat and the valve may be rotatable to a position in which the airflow is discharged through the outlet towards the seat. The vent assembly may thus be used to facilitate targeted ventilation of an occupant of the passenger seat.

The vehicle may further comprise a pillar extending between a floor and a roof of the vehicle and the vent assembly may be mounted to the pillar. In this arrangement the vent assembly may direct a jet of air projecting across the full width of the passenger cabin.

BRIEF DESCRIPTION OF THE DRAWINGS

In order that the present invention may be more readily understood, embodiments of the invention will now be described, by way of example, with reference to the accompanying drawings, in which:

FIGS. 3*a*, 3*b*, 3*c* and 3*d* show the vent assembly previously identified in FIG. 2 in isolation in schematic perspective, front elevation, rear elevation and side elevation views respectively;

FIGS. 5*a* and 5*b* are cross-sectional views of the vent assembly along lines A-A and B-B respectively as identified in FIG. 3*b*;

DETAILED DESCRIPTION OF THE INVENTION

Figure 1:
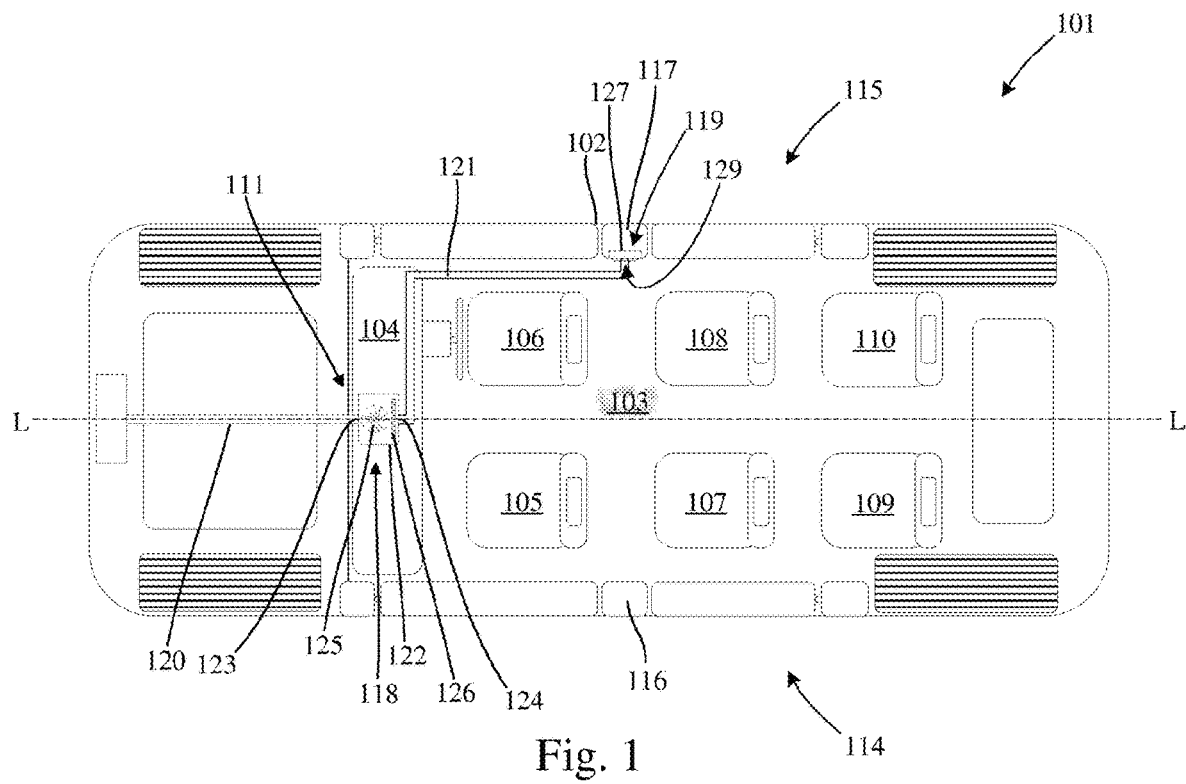
FIG. 1 is a schematic aerial view of a passenger car embodying the present invention, comprising a ventilation system for ventilating a passenger cabin of the car.
Figure 2:
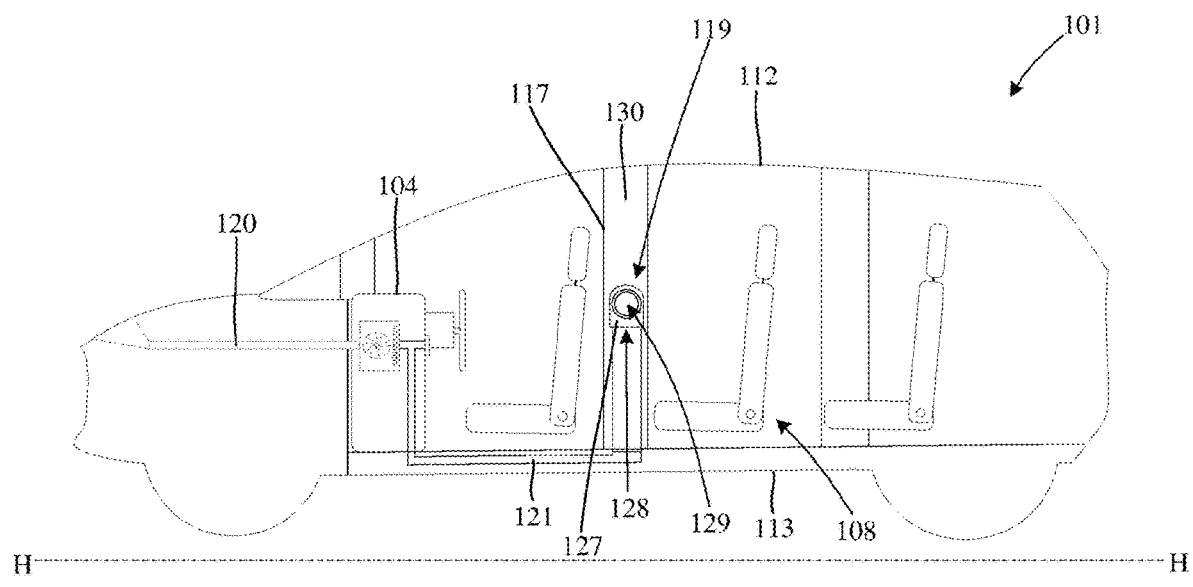
FIG. 2 is a schematic side view of the passenger car showing a vent assembly of the ventilation system.
Figure 4A:
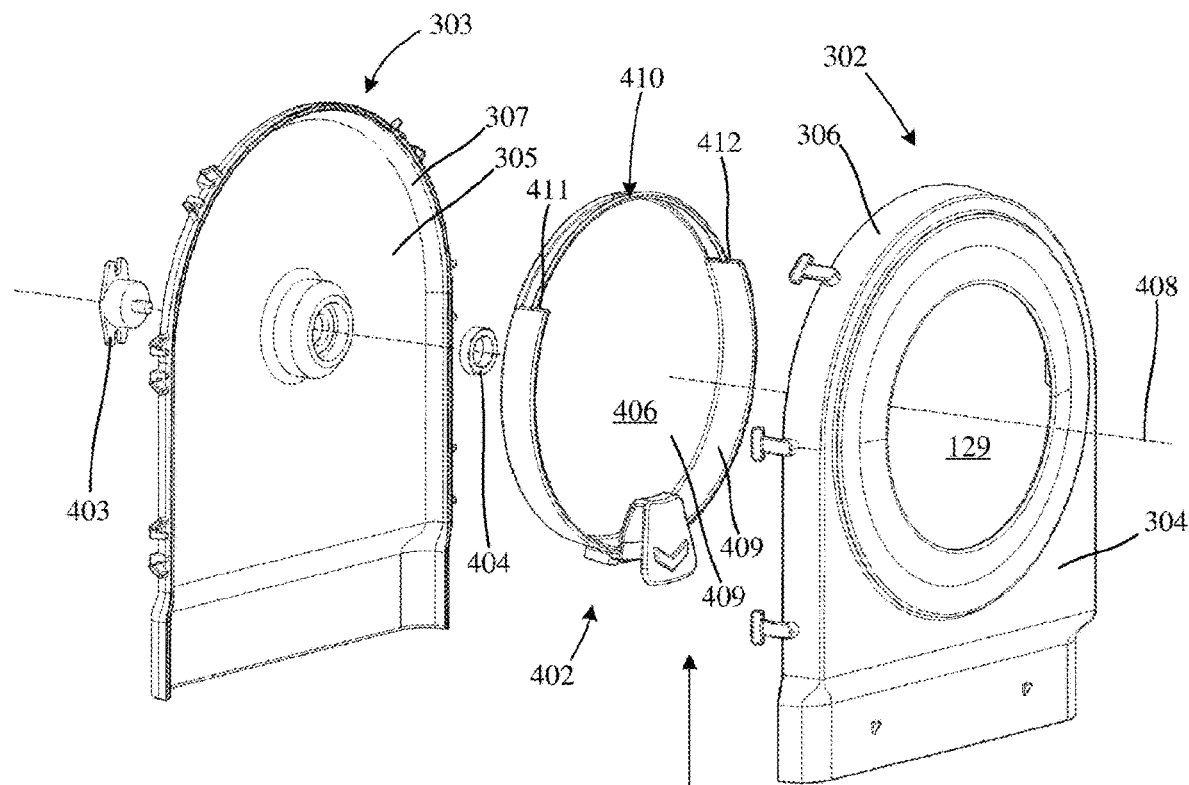
FIGS. 4*a* and 4*b* show the vent assembly again in isolation in exploded perspective and exploded side elevation views respectively.
Figure 4B:
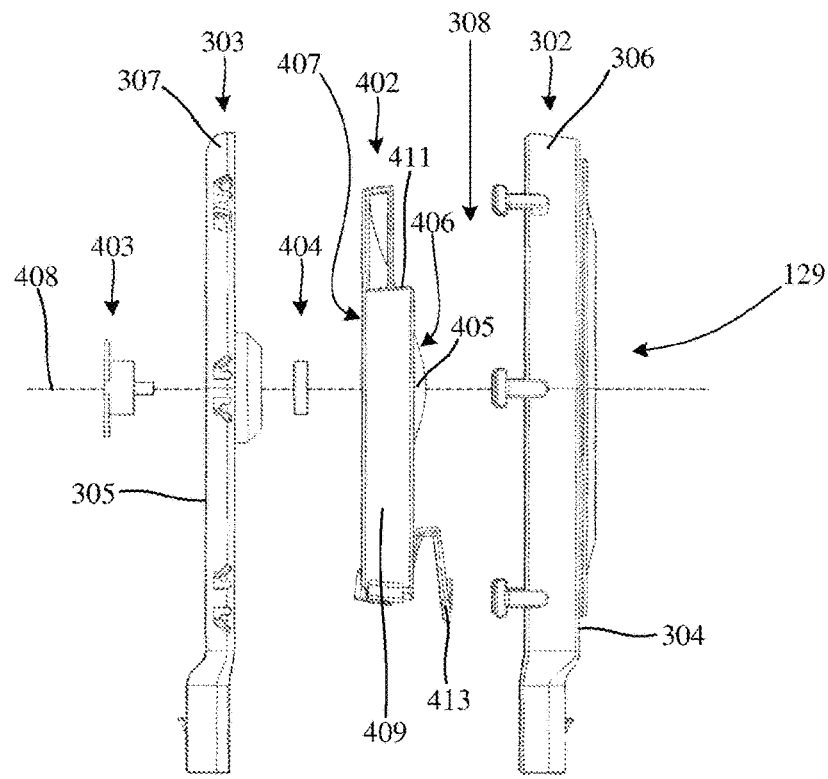

A vehicle, in the form of a passenger car 101, according to an exemplary embodiment of the present invention is shown in FIGS. 1 and 2.

Referring to the Figures, vehicle 101 comprises a body structure 102 defining internally a passenger cabin 103 for accommodating passengers, an instrument panel 104 carrying vehicle controls located at a front end of the passenger cabin 103, a plurality of seats 105 to 110 for seating passengers located in a seating region of the passenger cabin, and a ventilation system 111 for ventilating the passenger cabin to improve occupant comfort.

The body structure 103 comprises a roof structure 112 extending over the passenger cabin 103, a floor structure 113 extending under the passenger cabin 103, and left and right side structures indicated generally at 114 and 115 respectively. The left and right side structures 114, 115 each comprise a plurality of structural pillars, including 'B' pillar pair 116, 117 extending upwardly from the floor 113 to the roof 112. The instrument panel 104 is installed at a front end of the passenger cabin 103 forwardly of the seating region and extends transversely, i.e. in the width dimension, of the passenger cabin 103 between the left and right side structures 114, 115.

The plurality of seats 105 to 110 are arranged in three transverse rows of two seats. Thus, a first row of seating is formed by seats 105 and 106, a second row of seating by seats 107 and 108, and a third row of seating by seats 109 and 110. Each of the rows of seats comprises a left-hand seat 105, 107, 109 respectively, positioned to a left-side of a longitudinal centreline, L, of the passenger cabin, and a right-hand seat 106, 108, 110 respectively, positioned to a right-side of the longitudinal centreline L.

Ventilation system 111 comprises an air-handling unit 118, a vent assembly 119, and duct assemblies 120, 121.

Air-handling unit 118 comprises a housing 122 defining an inlet 123 and an outlet 124. The housing 122 contains an electrically driven fan assembly 125 and a heating element 126. The fan unit 125 is operable by conventional control circuitry to generate an airflow in through the inlet 123, over the heating element 126, and out through the outlet 124. In the example the heating element 126 is a conventional liquid-air heat exchanger through which a heated liquid is circulated by a remote source. The air-handling unit 118 is installed at a front end of the passenger cabin 103 forwardly of the instrument panel 104.

Vent assembly 119 comprises a body 127 defining an inlet 128 and an outlet 129. The vent assembly 119 is mounted to the B-pillar 117 of the body structure 102 at a height that is approximately equidistant between the floor 113 and the roof 112, with the outlet 129 facing across the passenger cabin 103. The B-pillar 117 comprises an interior trim panel 130 and the body 127 of the vent assembly 119 is located behind the interior trim panel 130 such that the body 127 is obscured from the view of occupants of the passenger cabin 103. The outlet 129 of the vent assembly 119 is open to the passenger cabin 103 through an aperture in the interior trim panel 130.

Duct assemblies 120, 121 communicate the inlet 123 of the air-handling unit 118 with atmosphere surrounding the vehicle and the outlet 124 of the air-handling unit with the inlet 128 of the vent assembly 129 respectively. The ventilation system 111 is thus operable to draw air in from atmosphere, over the heating element 126, and discharge the air through the vent assembly 119 into the passenger cabin 103. As will be described with reference to later Figures, in the example the vent assembly 119 is adapted to direct a jet of air towards the seat 108 to provide ventilation to an occupant of that seat.

Referring collectively to FIGS. 3*a* to 3*d*, FIGS. 4*a* and 4*b*, and FIGS. 5*a* and 5*b*, the vent assembly 119 comprises the body 127 and a deflector assembly 401.

Body 127 comprises front casing 302 and rear casing 303. Each of the front and rear casings 302, 303 comprises a substantially planar panel 304, 305 and a flange 306, 307 upstanding from the periphery of the planar panel 304, 305 respectively. The front and rear casings 302, 303 are joined by the flanges 306, 307 such that the panels 304, 305 are spaced apart and a chamber 308 is defined therebetween. The front casing 302 defines the outlet 129 which is formed as a substantially circular aperture through the panel 304. The front casing 302 and rear casing 303 together define the inlet 128 at a lower end of the body 127 between the spaced apart panels 304, 305. The chamber 308 extends between the inlet 128 and the outlet 129 and defines a closed passage for air flowing therebetween.

The deflector assembly 401 comprises a rotor assembly 402, a mount assembly 403 and a bearing assembly 404.

Rotor assembly 402 comprises a domed disc 405 having a convex front surface 406 and a concave rear surface 407. In the example, the disc 405 is substantially axisymmetric about a central axis 408 of the convex surface which extends through the apex of the convex surface 406 normally to the convex surface. The disc 405 and the front and rear surfaces 406, 407 thereof are each substantially circular in area.

Rotor assembly 402 also comprises a wall 409 rigidly joined to the convex surface 406 of the disc 405 and upstanding therefrom. The wall 409 is general hemispherical in the axial direction of the deflector and arranged to extend circumferentially around the convex surface 406 adjacent the peripheral edge of the disc 405. In the example, the wall 409 subtends a central angle of approximately 230° such that the wall extends around just less than three-quarters of the circumference of the convex surface 406. The wall 409 thus defines an opening 410 between free ends 411, 412 that subtends a central angle of approximately 130°, i.e. such that the opening 410 extends around just more than one-quarter of the circumference of the convex surface 406.

The mount assembly 403 comprises a base and a shaft. The base is rigidly fixed to a back of the panel 305 of the rear casing 303 and the shaft of the mount assembly projects through an aperture formed in the panel 305 into the chamber 308. The bearing assembly 404 comprises a roller bearing having an inner race that is received on the shaft of the mount assembly 403 by way of an interference fit, and an outer race that is free to rotate about the shaft of the mount assembly.

The rotor assembly 402 is located within the chamber 308 in the path of airflow therethrough between the inlet 128 and the outlet 129. The disc 405 of the rotor assembly 402 is attached to the outer race of the bearing assembly 404 by an interference fit and the rotor assembly 402 is rotatable therewith about the axis 408. Rotor assembly 402 further comprises a handle 413 rigidly coupled to the disc 405 and arranged to project outwardly of the body 127 through the outlet 129. Consequently, the handle 413 may be manipulated by an occupant of the passenger cabin to rotate the rotor assembly 402 within the chamber 308 about the axis of rotation 408.

Referring next in particular to FIGS. 5*a* and 5*b*, it can be seen that, in the assembled condition, the rotor assembly 402 is arranged in the chamber 308 with the concave surface 407 of the disc 405 facing the rear casing 303 and the convex surface 406 facing the front casing 302. The rotor assembly 402 is located directly behind the outlet 129 such that the axis 408 projects through the outlet 129. The rotor assembly 402 is thus located in the path of airflow through the chamber 308 between the inlet 128 and the outlet 129 of the body 127 such that substantially all the air flowing between the inlet 128 and the outlet 129 encounters the rotor assembly 402 and must flow across the convex surface 406 thereof.

The outer diameter D1 of the chamber 308 is greater than the outer diameter D2 of the rotor assembly 402 such that the chamber 308 extends circumferentially around the full circumference of the rotor assembly 402. The wall 409 extends from the convex surface 406 of the disc 405 substantially the full distance to the inner side of the front casing 302. The wall 409 thus forms a substantially airtight seal between the convex surface 406 of the disc 405 and the front casing 302, thereby partially dividing the chamber 308 from the outlet 129, and restricting airflow from the circumferential chamber 308 across the convex surface 406 of the disc 405.

Airflow from the chamber 308 may however be admitted across the convex surface 406 through the opening 410 defined by the wall 409. As indicating in the Figure, airflow flowing from the chamber 308 across the convex surface 406 of the disc 405 may be deflected by the convex surface outwardly of the body 127 through the outlet 129 as a jet of air directed along the jet axis 501.

The wall 409 of the rotor assembly 402 thus functions as a valve to restrict the direction of airflow from the chamber 308 across the convex surface 406. Moreover, because the wall 409 of the rotor assembly 402 is rotatable relative to the chamber 308, the angular position of the opening 410 of the wall 409 can be varied. As a result, the direction of airflow across the convex surface 406, and so the direction of the resultant jet of air formed by the airflow as it detaches from the convex surface 406, can be controllably adjusted by rotation of the wall 409 to thereby vary the direction of the jet axis of the jet of air discharged into the passenger cabin 103 of the vehicle.

Figure 6A:
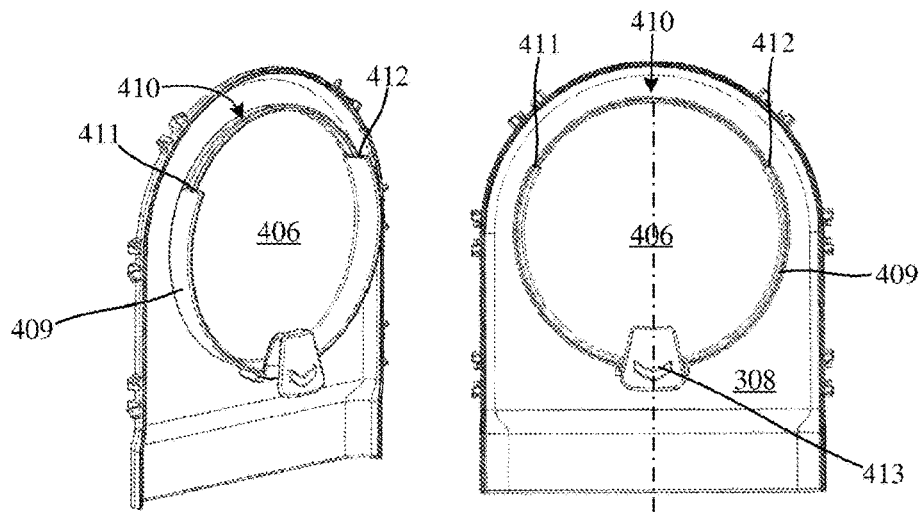
FIGS. 6*a*, 6*b* and 6*c* are partial views of the vent assembly in which the front casing 302 is removed to show a valve member of the vent assembly in three different positions.
Figure 6B:
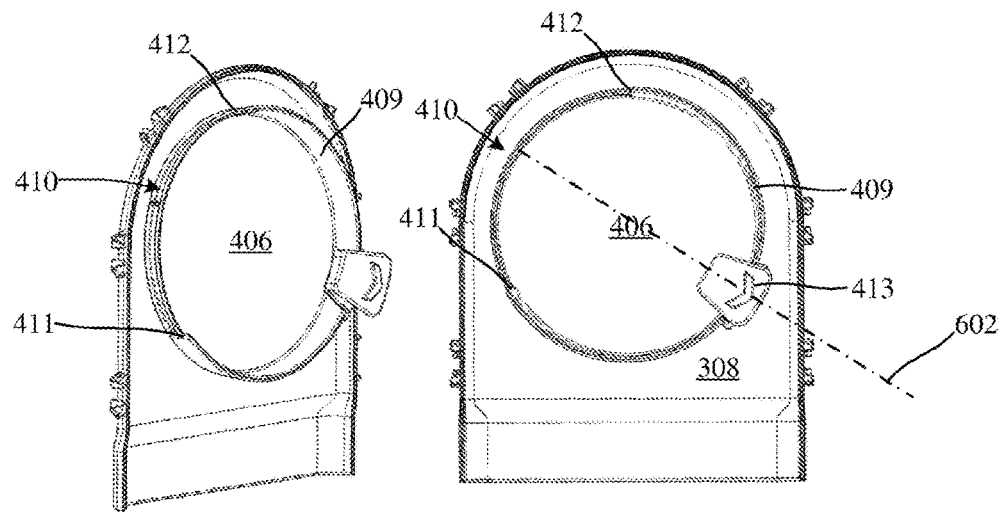
Figure 6C:
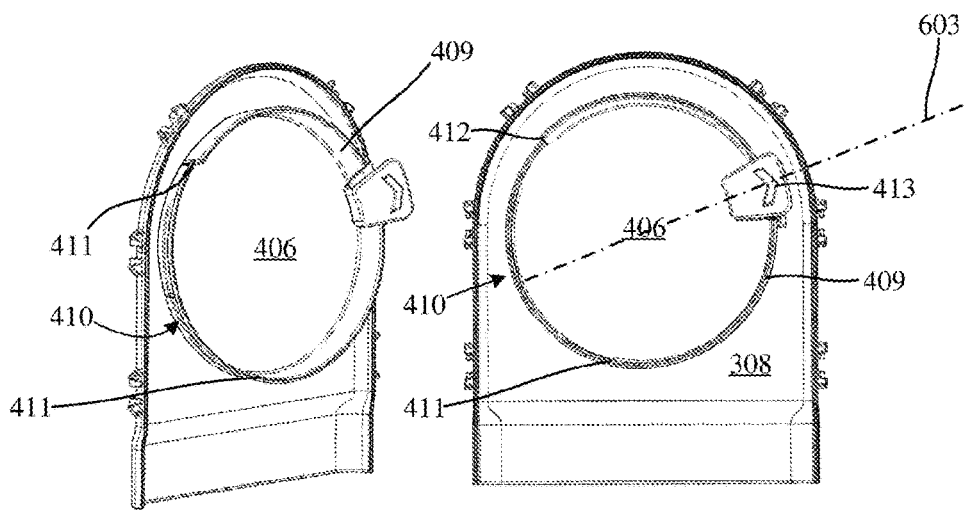

Referring next to FIGS. 6a to 6c, as previously described, the rotor assembly 402 is rotatable within the chamber 308, by manipulation of the handle 413 by a user, through a rotation angle of approximately 180° about the axis of rotation 408 to thereby vary the direction of airflow across the convex surface 406 of the rotor assembly 402.

Referring firstly to FIG. 6a, the rotor assembly 402 is shown in a first angular position in which the opening 410 defined by the wall 409 is located at a twelve o'clock position with respect to the convex surface 406. As a result, the wall 409 restricts airflow from the chamber 308 across the convex surface 408 to a generally downwards direction. Consequently, the airflow may be expected to detach from the convex surface 406 to form a jet of air directed along the jet axis 601 in a generally downwards direction.

Referring secondly to FIG. 6b, the rotor assembly 402 is shown having been rotated anti-clockwise about the axis of rotation 408 to a second angular position. In the second angular position the opening 410 of the wall 409 is located at a ten o'clock position with respect to the convex surface 406. As a result, the wall 409 restricts airflow from the chamber 308 across the convex surface 406 to a generally diagonally downwards direction. Consequently, the airflow may be expected to detach from the convex surface 406 to form a jet of air directed along the jet axis 602 in a generally diagonally downwards direction.

Referring thirdly to FIG. 6c, the rotor assembly 402 is shown having been further rotated anti-clockwise about the axis of rotation 408 to a third angular position. In the third angular position the opening 410 of the wall 409 is located at the eight o'clock position with respect to the convex surface 406. As a result, the wall 409 restricts airflow from the chamber 308 across the convex surface 406 to a generally diagonally upwards direction. Consequently, the airflow may be expected to detach from the convex surface 406 to a form a jet of air directed along the jet axis 603 in a generally diagonally upwards direction.

Figure 7A:
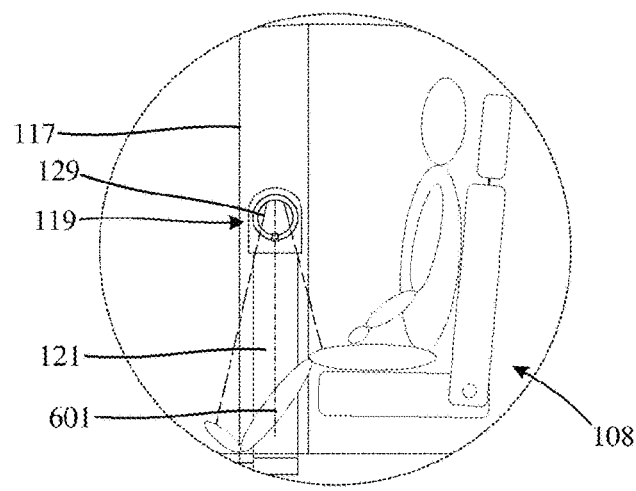
FIGS. 7*a*, 7*b* and 7*c* are schematic views of the path of a jet of air discharged by the vent assembly into the passenger cabin of the car.
Figure 7B:
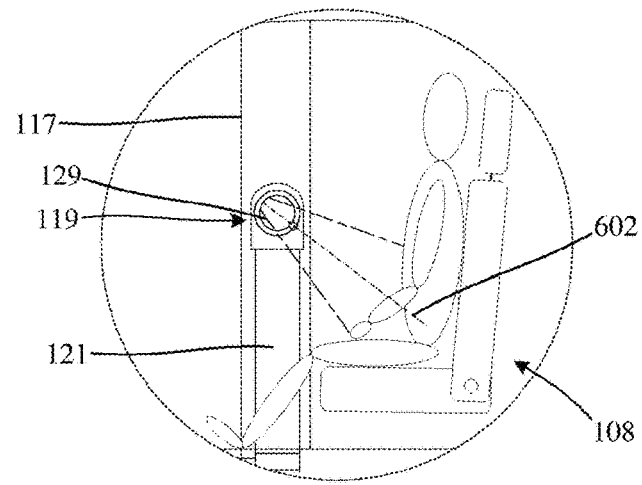
Figure 7C:
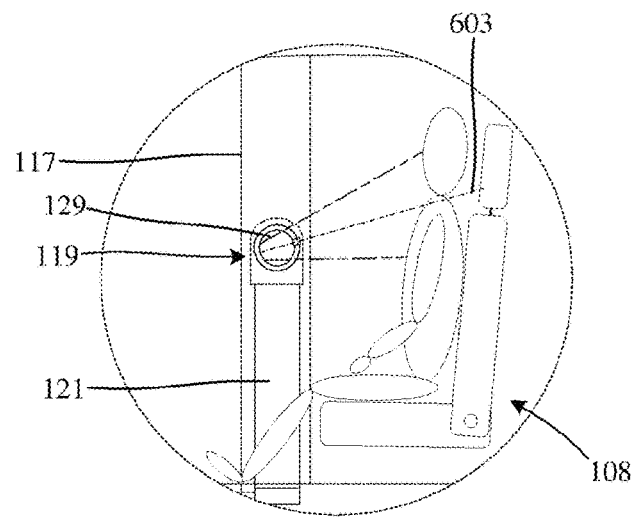
Figure 8A:
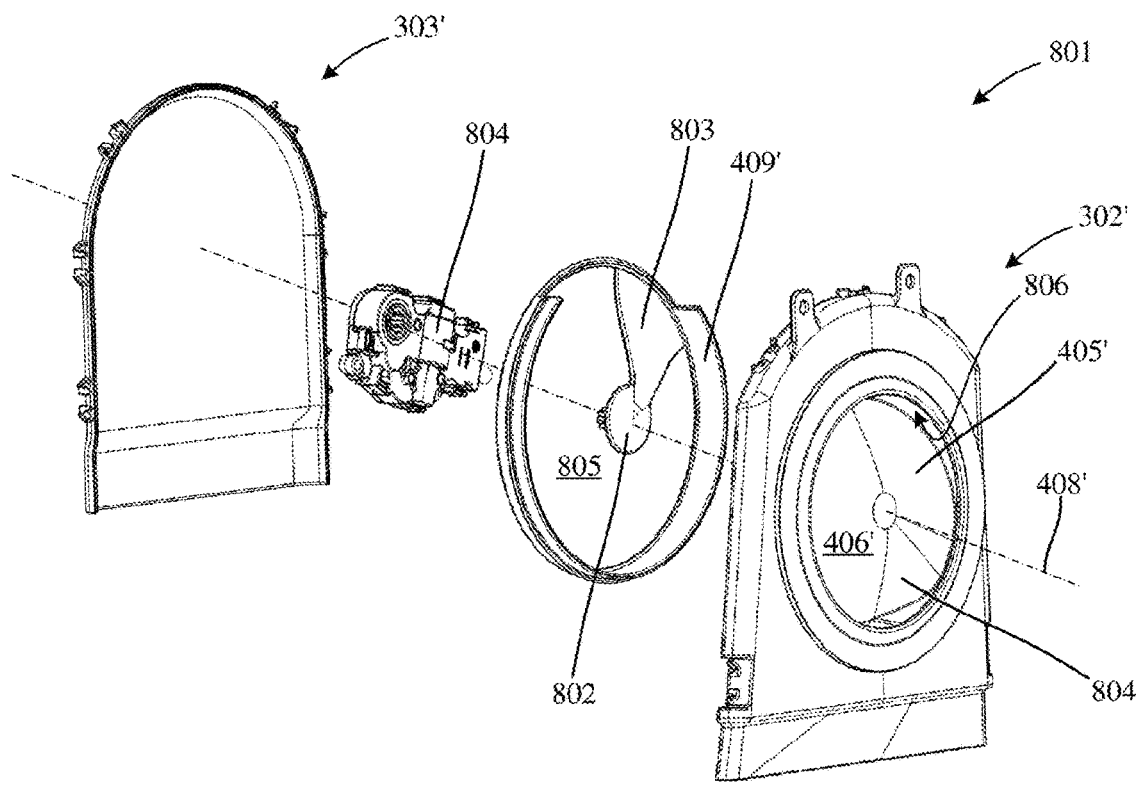
FIGS. 8*a* and 8*b* show a second vent assembly embodying the invention schematically in exploded perspective and exploded side elevation views respectively.
Figure 8B:
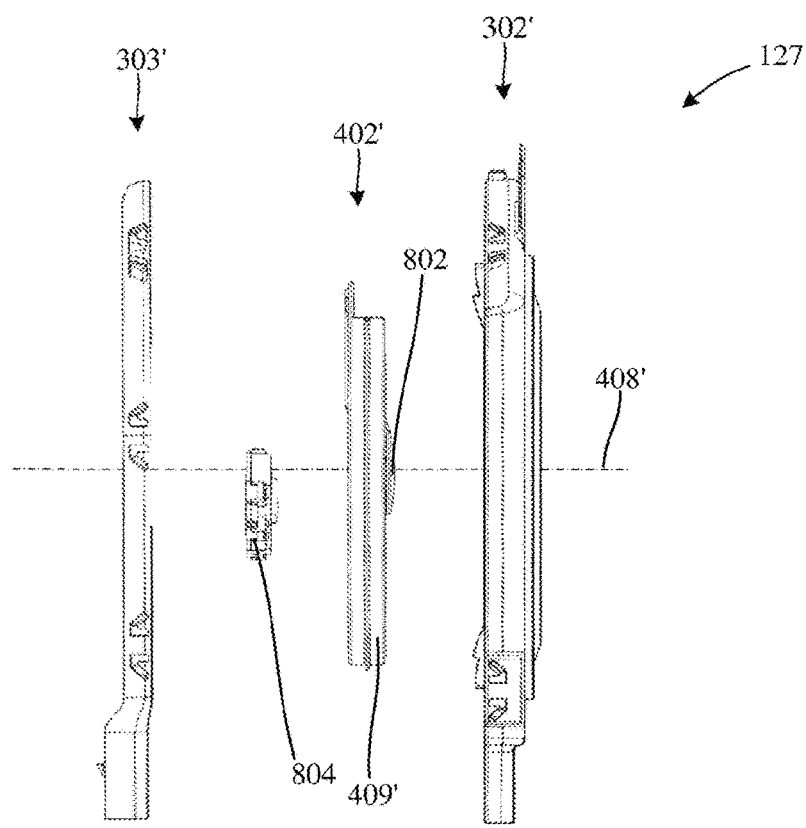

Turning next to FIGS. 7a to 7c, as previously described, the ventilation system is arranged to discharge airflow into the passenger cabin in a direction towards the passenger seated in the second row seat 108.

Referring firstly to FIG. 7a, the ventilation system is shown being operated with the vent assembly 119 in a first configuration which corresponds generally to the configuration depicted in FIG. 6a. In this configuration, as previously described, the vent assembly directs a jet of air through the outlet 129 along a jet axis 601 directed vertically downwards. Consequently, the jet of air is directed along the axis 601 downwards generally towards the feet of the seated passenger.

Referring secondly to FIG. 7b, the ventilation system is shown being operated with the vent assembly in a second configuration which corresponds generally to the configuration depicted in FIG. 6b. In this configuration, as previously described, the vent assembly directs a jet of air through the outlet 129 along a jet axis 602 directed diagonally downwards. Consequently, the jet of air is directed along the axis 602 generally towards the lap and lower torso/abdomen of the seated passenger.

Referring thirdly to FIG. 7c, the ventilation system is shown being operated with the vent assembly in a third configuration which corresponds generally to the configuration depicted in FIG. 6c. In this configuration, as previously described, the vent assembly directs a jet of air through the outlet 129 along a jet axis 603 directed diagonally upwards. Consequently, the jet of air is directed along the axis 603 generally towards the neck and face of the seated passenger.

Referring finally to FIGS. 8a, 8b, 9a and 9b, an alternative embodiment of the vent assembly 119 as previously described with reference to FIGS. 1 to 7 is shown.

Vent assembly 801 is similar in construction to vent assembly 119 of FIGS. 1 to 7, and like reference numerals will be used to denote equivalent features. Similarly to vent assembly 119, vent assembly 801 comprises a body 127' comprising front and rear casings 302', 303', which in the assembled condition define internally a chamber 308' extending between the inlet 128' and the outlet 129'. Vent assembly 801 further comprises a disc 405' arranged in the path of air flowing through the chamber 308' between the inlet 128' and the outlet 129', having a convex surface 406' facing towards the passenger cabin 103 for deflecting the airflow through the outlet 129', and a convex surface 407' opposing the convex surface 406'. Vent assembly 801 further comprising a a rotor assembly 402' for restricting the direction of airflow across the convex surface 406'.

Unlike vent assembly 119, for vent assembly 801 the disc 405' and the convex surface 406' thereof is integral with the front casing 302'. An annular outlet 806 is defined between the disc 405' and the panel 304' of the front casing 302' through which airflow may be discharged from the vent assembly. Further, unlike vent assembly 119, the rotor assembly 402' of vent assembly 801 is a separate component to the disc 405' that is rotatable relative to the disc 405' and the convex surface 406'. Further, unlike the axisymmetric convex surface 406 of the vent assembly 119, the convex surface 406' defines a ramp profile 804 inclined in the circumferential direction of the convex surface 406'.

Figure 9A:
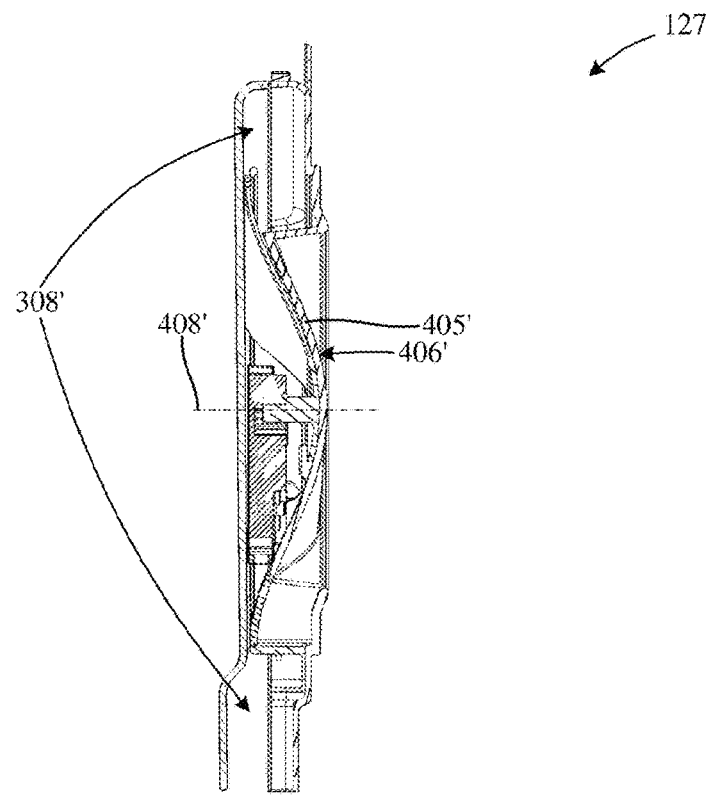
FIGS. 9*a* and 9*b* are schematic side-sectional and exploded side-sectional views of the second vent assembly.
Figure 9B:
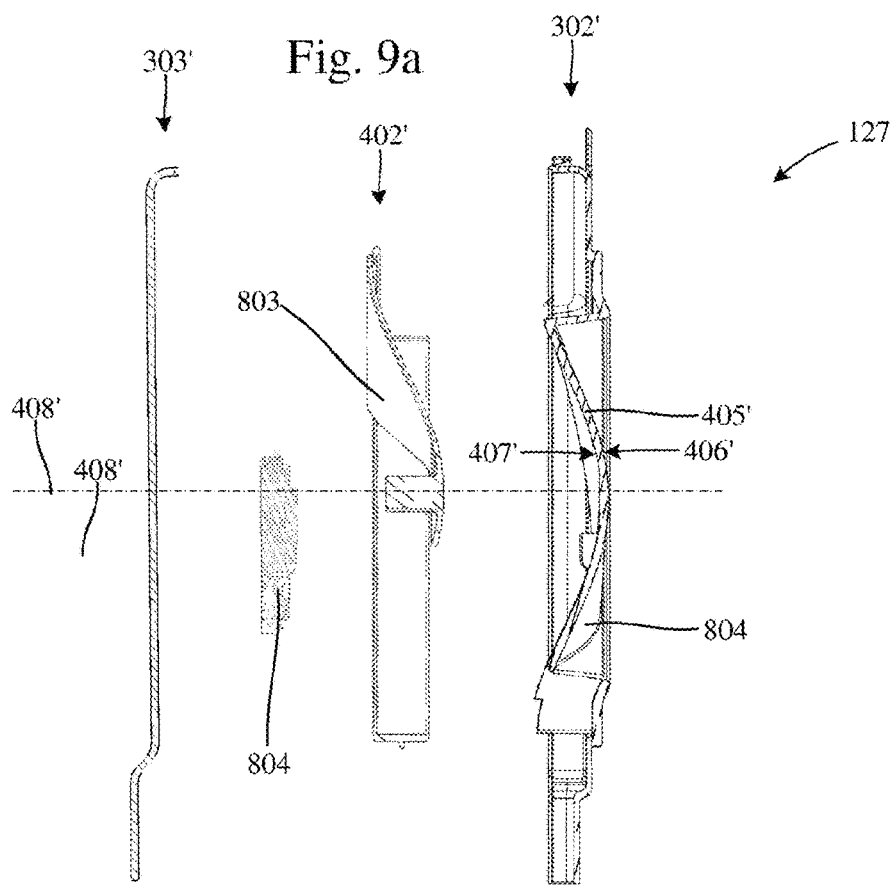

The rotor assembly 402 comprises a hub 802, a wall 409', and a spoke 803 spanning a gap 805 between the hub 802 and the wall 409' and rigidly connecting the wall to the hub. The wall 409' similarly subtends a central angle of approximately 230°, and defines an opening 410' which subtends a central angle of approximately 130°. In the assembled condition, as shown in FIG. 9a, the wall 409' extends circumferentially about the convex surface 406' between the inner side of the rear casing 303' and the inner side of the front casing 302.

Similarly to the vent assembly 119, the wall 409' of the vent assembly 801 acts to restrict the direction of airflow from the chamber 308' across the convex surface 406', and the rotor assembly is rotatable about the axis of rotation 408' to thereby vary the angular position of the opening 410' relative to the convex surface 406', and so vary the direction of airflow across the convex surface 406', and so the direction of the jet axis of the jet of air formed by the airflow detaching from the convex surface 406'.

In this embodiment, the vent assembly 801 further comprises a stepper motor 804 for controlling rotation of the rotor assembly 402'. The stepper motor 804 is rigidly mounted to the rear casing 303', and comprises a rotatable shaft to which the hub 802 of the rotor assembly 402' is rigidly coupled and which thereby defines an axis of rotation of the rotor assembly 402'. The stepper motor 804 is thus operable by way of conventional electronic control means to cause the rotor 402' to rotate about the axis of rotation 408', and so to cause the wall 409' to move circumferentially about the convex surface 406'. In the assembled condition shown in FIG. 9a, the stepper motor 804 is partially nested in the concavity formed by the concave surface 407' of the disc 405'.

The references in this specification to a "jet axis" is to an axis extending from the outlet of the vent assembly in the average direction in which the jet of air is discharged from the outlet. Whilst it is to be appreciated that, due for example to buoyancy of the jet and the force of gravity acting on the jet, the direction of the jet of air will typically deviate from the jet axis as it travels through the cabin environment, the jet axis may nevertheless typically be expected to represent a good approximation of the path of the jet of air through the cabin.

The jet axis of a jet of air may be derived with reference to the jet centreline of the jet, the jet centreline representing the locus of points at which the (time-averaged) velocity if the jet is a local maximum, i.e. plotting the actual average direction of the jet of air as it travels an infinitesimally short distance from the outlet through the cabin environment. The jet axis may thus be taken as the tangent of the jet centreline at the outlet of the vent assembly. The jet centreline and thus the jet axis may be determined by evaluating the velocity field of the jet of air using the known background oriented schlieren (BOS) imaging technique. As is known, using the BOS technique, the density field of the jet of air may be computed based on the light deflection created during the passage of light through the understudy jet. The velocity field may subsequently be derived from the density field using known relationships and methodology. Alternative known velocity field measuring techniques include hot wire anemometry.

References in this specification to "left-hand" or "left" and "right-hand" or "right" are directional definitions from the perspective of an observer facing forwardly of the vehicle, as is the conventional nomenclature in the field of the invention. Similarly references to "forwardly" or "forward" and "rearwardly" or "rearward" are, as is conventional, definitions relative to the front and rear of the vehicle respectively.

References in this specification to a "central axis" of the convex surface means an axis extending through an apex of the convex surface normally to the convex surface at the apex.

The invention claimed is:

1. A vehicle comprising a passenger cabin and a vent assembly, the vent assembly comprising:

a duct for carrying an airflow and having an outlet through which the airflow is discharged into the passenger cabin;

a deflector located within the duct, the deflector having a convex surface across which the airflow passes; and a valve extending around at least part of the convex surface for restricting the direction of the airflow across the convex surface, wherein the airflow is discharged through the outlet in a direction defined by the direction of the airflow across the convex surface; and the valve is rotatable to vary the direction of the airflow across the convex surface.

2. The vehicle as claimed in claim 1, wherein the valve prevents the airflow from being admitted around at least half of the convex surface.

3. The vehicle as claimed in claim 1, wherein the valve comprises an opening for admitting the airflow across the convex surface, and the valve is rotatable such that the opening moves along a path extending around the convex surface.

4. The vehicle as claimed in claim 3, wherein the valve is rotatable such that the opening moves along the path through a central angle of at least 90°.

5. The vehicle as claimed in claim 1, wherein the valve is rotatable about an axis of rotation that intersects an apex of the convex surface.

6. The vehicle as claimed in claim 1, wherein the outlet overlies the convex surface of the deflector.

7. The vehicle as claimed in claim 1, wherein a portion of the duct located upstream of the deflector extends normally to a central axis of the convex surface.

8. The vehicle as claimed in claim 1, wherein the valve is rotatable independently of the deflector.

9. The vehicle as claimed in claim 1, wherein the valve is joined to and rotatable with the deflector.

10. The vehicle as claimed in claim 1, wherein the convex surface is axisymmetric about an axis of rotation of the valve.

11. The vehicle as claimed in claim 1, wherein the convex surface defines a ramp in the circumferential direction of the convex surface.

12. The vehicle as claimed in claim 1, further comprising a handle connected to the valve for manipulation by an occupant of the passenger cabin to cause the valve to rotate.

13. The vehicle as claimed in claim 1, further comprising an electric motor connected to the valve, wherein the electric motor is operable to cause the valve to rotate.

14. The vehicle as claimed in claim 13, wherein the electric motor is at least partially located within a cavity of the deflector.

15. The vehicle as claimed in claim 1, wherein the vehicle comprises a seat located in the passenger cabin for seating a passenger, the vent assembly is located at a position forward of the seat and the valve is rotatable to a position in which the airflow is discharged through the outlet towards the seat.

16. The vehicle as claimed in claim 1, wherein the vehicle comprises a pillar extending between a floor and a roof of the vehicle and the vent assembly is mounted to the pillar.

* * * * *